Aug. 7, 1951  R. R. CROOKSTON  2,563,584
DEVICE FOR GIVING SHAFT ANGULAR MOVEMENTS
Filed July 22, 1950
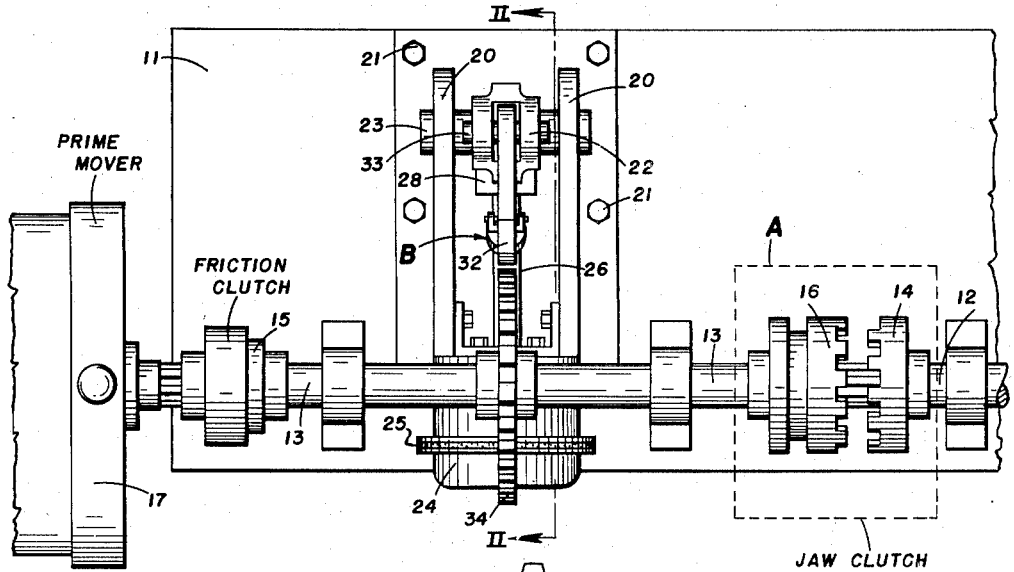
FIG. 1.
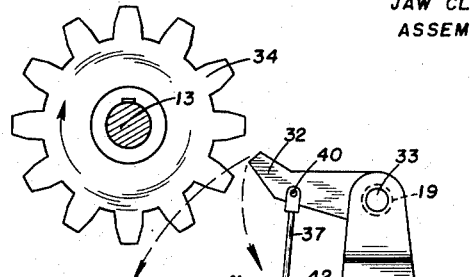
FIG. 2.
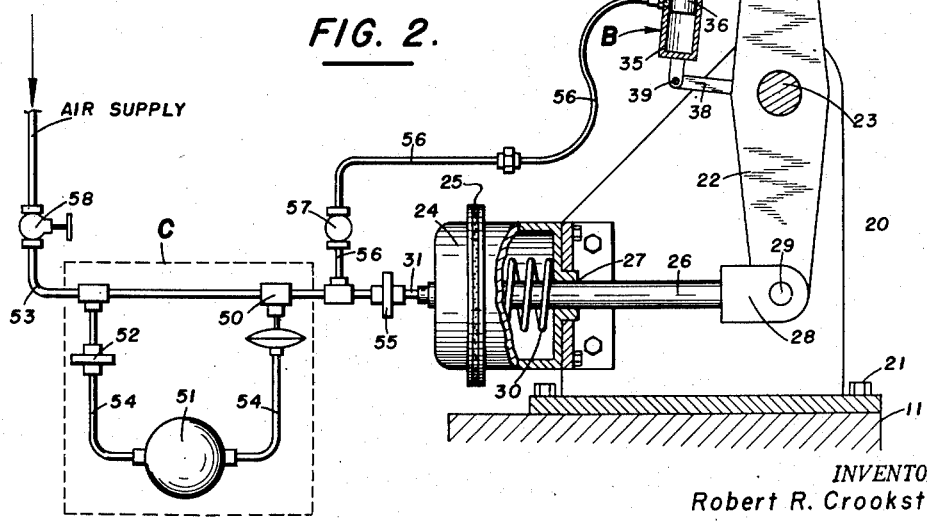
INVENTOR.
Robert R. Crookston,
BY
*J. S. McKean*
ATTORNEY.

Patented Aug. 7, 1951

2,563,584

UNITED STATES PATENT OFFICE 2,563,584

DEVICE FOR GIVING SHAFT ANGULAR MOVEMENT

Robert R. Crookston, Houston, Tex., assignor, by mesne assignments, to Standard Oil Development Company, Elizabeth, N. J., a corporation of Delaware Application July 22, 1950, Serial No. 175,360

1 Claim. (Cl. 74—142)

This application is directed to a device for giving a shaft angular movement. The device is particularly adapted for giving one of the engaging or jaw members of a jaw clutch an angular motion preparatory to bringing the two jaws of the clutch together to give said jaws an opportunity to enter into proper engagement.

The features and advantages of the device of the present invention will be seen from the following description taken in conjunction with the drawing, in which Fig. 1 is a plan showing an embodiment of the device of the present invention mounted adjacent a jaw clutch for assisting the operation thereof;

Fig. 2 is a sectional view taken along line II—II of Fig. 1 with connections to a compressed air system for operating the device shown.

Turning now specifically to the drawing, a frame 11 provides a mounting means for rotatable, coaxial shafts 12 and 13, the ends of said shafts being connected or disconnected at the option of the operator by means of a jaw clutch assembly A. The jaw clutch assembly A consists of a jaw 14 secured to shaft 12 and a jaw 16 slidably splined to shaft 13, so as to be engaged or disengaged to jaw 14 of shaft 12. It will be understood by a workman skilled in the art that the engaging means may be a piston or diaphragm operated by compressed air or other mechanical means capable of moving the jaw 16 into engagement with jaw 14 upon admission of compressed air thereto and capable of moving the jaw 16 out of engagement with jaw 14 upon bleeding the compressed air out of said means. However, since power-actuated means for operating jaw clutches are well known to the art, the engaging means are not shown in the drawing. A prime mover 17 is connected through friction clutch 15 to shaft 13. It will be understood that prime mover 17 may be of any conventional type such as an internal combustion engine or steam engine. The parts thus far described are conventional to the art.

A bracket 20 is secured to frame 11 by suitable means such as cap screws 21 and carries a lever arm 22 which is journaled on a stub shaft 23 carried by bracket 20.

A chamber or housing 24 is mounted on bracket 20. Within the housing is a diaphragm 25 having a rod 26 secured to its central portion, rod 26 fitting slidably in opening 27 of the housing and terminating in a crosshead member 28 having a stub shaft 29 journaled in a corresponding opening in the lower end of the lever arm 22. A spring 30 encircles the portion of rod 26 within housing 24 to exert a bias on the rod tending to return diaphragm 25 to its initial position at the center of housing 24. Movement of diaphragm 25 to the right is produced by compressed air admitted to the left portion of the housing by compressed air inlet line 31.

A finger or detent 32 is journaled to a stub shaft 33 fitting into a corresponding opening at the upper end of lever arm 22 and is provided with a spring 19 to bias it to an initial position. The free end of detent 32 is shaped in the form of a gear tooth and is adapted to mesh with the teeth of gear 34 which is mounted on shaft 13. A piston and cylinder assembly B which consists of a cylinder 35, piston 36 and piston rod 37 is secured between lever arm 22 and detent 32. The end of cylinder 35 of assembly B is secured to a bracket 38 projecting from approximately the middle of lever arm 22 and by means of pivot 39. The upper end of piston rod 37 is forked and this end is secured to detent 32 by a pivot 40. A compressed air inlet 41 enters the side of cylinder 35 and spaced above inlet line 41 is a bleeder orifice 42.

A suitable compressed air control is shown connected to the device. This means includes a timer assembly C which consists of a normally open bleeder type diaphragm valve 50, a chamber 51, an orifice 52. A compressed air inlet line 53 has valve 50 mounted therein and a branch line 54 has orifice 52 mounted therein and connects the chamber 51 to the diaphragm of valve 50. Between the timer assembly C and chamber 24 is inserted an orifice member 55 and between orifice member 55 and timer C a branch line 56 with a check valve 57 therein connects the inlet port 41 of assembly B with the air inlet line 53. The admittance of compressed air to the control system is controlled by a bleeder type valve 58.

The device of the present invention may be operated in this manner. Opening valve 58 allows compressed air to pass to chamber 24 which forces diaphragm 25 and in turn the lower end of lever arm 22 to the right. The lever arm pivots over stub shaft 23 in the counterclockwise direction which moves the upper end of lever arm to the left and causes the free end of detent 32 to engage between adjacent teeth of gear 34, this moves gear 34 in the clockwise direction. As the outer end of detent 32 moves through an arc and imparts energy to gear 34, the rotation of gear 34 causes the tooth behind detent 32 to push the detent downwardly. When such movement is given the detent 32 it forces piston 36 down below air inlet port 42 whereupon the compressed air enters cylinder 35 through air inlet port 41 and forces piston 36 down to the bottom of cylinder 35. Diaphragm 50 is of the bleeder type and is proportioned so that after an opportunity has been given for detent 32 to move gear 34 and then to be pushed downwardly by gear 34, valve 50 bleeds air from chamber 25 and allows spring 30 to return diaphragm 25 to its original position. As diaphragm 25 returns to its original position it moves lever arm 22 in the clockwise direction and returns it to its original position. When lever arm 22 is returned to its original position, detent 32 is still pulled downward out of its original position so that it does not touch gear 34. However, bleeder 42 allows air to be bled slowly from cylinder 35 and is proportioned so that some time after lever 22 has returned to its original position compressed air is bled from cylinder 35 and allows spring 19 to return detent 32 to its original position. If valve 58 is closed it bleeds air from timer C and allows valve 50 to assume its normally open position. When this has occurred all the parts of the device have assumed their original positions and the same sequence of events may be repeated by opening valve 58.

The device of the present invention may be used generally where jaw or spline clutches or similar members will be engaged or disengaged and it is desirable to have a device which will cause angular movement of one of the engaging members without imparting such an amount of energy thereto as will cause damage to the engaging members when they are brought into contact with each other. An application of the device of this case to jaw clutches is described in the co-pending application Serial No. 153,425, filed April 1, 1940, in the name of Douglas Ragland, entitled "Compressed Air Control System for Power Transmission Unit."

While I have described the specific embodiment of the present invention, it will be apparent to a workman skilled in the art that various changes may be made in the sizes, shapes and proportions of the several parts without departing from the scope of the invention.

Having fully described and illustrated the present invention, what I desire to claim is:

A device for giving angular movement to a shaft comprising, in combination, a toothed gear fixed to said shaft, a frame, a lever arm journaled to said frame, a detent journaled to one end of the lever arm having a free end adapted to mesh with teeth of the gear when said lever arm is given angular movement, a piston and cylinder assembly with the cylinder and a piston each provided with attaching means, the cylinder having an air inlet port in its wall adjacent the piston when the piston is in a normal position, and having a bleeder port spaced longitudinally away from the air inlet port, a pivot securing one of said attaching means to the detent and means securing the other said attaching means to the lever arm, a fluid tight chamber with a power element therein movable by fluid pressure, and a rod having one end secured to said power element and the other end journaled to said lever arm.

ROBERT R. CROOKSTON.

REFERENCES CITED

The following references are of record in the file of this patent:

UNITED STATES PATENTS

| Number | Name | Date |
| --- | --- | --- |
| 1,190,522 | Diack | July 11, 1916 |
| 1,275,780 | Spurr | Aug. 13, 1918 |